(12) United States Patent
Bauchot et al.

(10) Patent No.: US 8,807,946 B2
(45) Date of Patent: Aug. 19, 2014

(54) CYCLIC BLADE SPEED CONTROL APPARATUS AND METHOD

(75) Inventors: Frederic Bauchot, Saint-Jeannet (FR); Jean-Yves Clement, Saint-Jeannet (FR); Carole Truntschka, Saint-Laurent-Du-Var (FR)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 12/883,250

(22) Filed: Sep. 16, 2010

(65) Prior Publication Data

US 2012/0070279 A1 Mar. 22, 2012

(30) Foreign Application Priority Data

Sep. 16, 2010 (EP) ..................................... 10305990

(51) Int. Cl.
*F04D 29/18* (2006.01)
*B64C 27/41* (2006.01)

(52) U.S. Cl.
USPC .................. 416/105; 416/106; 416/134 A (58) Field of Classification Search
USPC ............................. 416/98, 103, 105, 106, 107
See application file for complete search history.

(56) References Cited

U.S. PATENT DOCUMENTS

| | | | |
|---|---|---|---|
| 2,465,681 A | 3/1949 | Gluhareff | |
| 2,957,526 A | 10/1960 | Derschmidt | |
| 3,035,644 A * | 5/1962 | Derschmidt | 416/102 |
| 3,204,701 A | 9/1965 | Muller et al. | |
| 3,289,770 A * | 12/1966 | Derschmidt | 416/105 |
| 3,729,272 A | 4/1973 | Lemont | |
| 4,650,400 A * | 3/1987 | David | 416/114 |
| 4,697,986 A | 10/1987 | David | |
| 4,720,059 A | 1/1988 | Stearns, Jr. | |
| 4,783,023 A | 11/1988 | Jupe | |
| 5,110,314 A * | 5/1992 | Fujihara et al. | 446/34 |
| 5,135,357 A | 8/1992 | Pancotti | |
| 5,228,640 A | 7/1993 | Mouille | |
| 5,372,478 A * | 12/1994 | McCafferty | 416/106 |
| 5,913,659 A * | 6/1999 | Doolin et al. | 416/107 |
| 6,182,923 B1 | 2/2001 | Weinhart | |
| 6,190,132 B1 | 2/2001 | Yamakawa et al. | |
| 6,398,496 B1 | 6/2002 | Jokinen | |

(Continued)

OTHER PUBLICATIONS

U.S. Appl. No. 13/105,996, filed May 12, 2011; First Named Inventor—Bauchot et al.; Confirmation No. 4391.
Office Action (Mail Date Dec. 19, 2013) for U.S. Appl. No. 13/105,996, filed May 12, 2011.

(Continued)

*Primary Examiner* — Nathaniel Wiehe
*Assistant Examiner* — Justin Seabe
(74) *Attorney, Agent, or Firm* — Schmeiser, Olsen & Watts; John Pivnichny (57) ABSTRACT

A blade speed control apparatus and method. The apparatus includes a rotor assembly a first blade assembly movably attached to the rotor assembly at a first initial position, a second blade assembly movably attached to the rotor assembly at a second initial position, and a movement mechanism configured to move the rotor assembly in a first lateral direction along a y-axis such that a first angle exists between the first blade assembly with said respect to the second blade assembly. The movement mechanism is configured to move a portion of the rotor assembly in a first lateral direction along a y-axis such that a first angle exists between the first blade assembly with said respect to the second blade assembly. The first angle does not comprise an angle of 180 degrees.

18 Claims, 8 Drawing Sheets

(56) References Cited

U.S. PATENT DOCUMENTS

2009/0180882 A1* 7/2009 Stille et al. .................. 416/140
2011/0027082 A1 2/2011 Herpin
2012/0282090 A1 11/2012 Bauchot et al.

OTHER PUBLICATIONS

Amendment filed Mar. 7, 2014 in response to Office Action (Mail Date Dec. 19, 2013) for U.S. Appl. No. 13/105,996, filed May 12, 2011.

* cited by examiner

CYCLIC BLADE SPEED CONTROL APPARATUS AND METHOD

FIELD OF THE INVENTION

The present invention relates to an apparatus and method for controlling a blade speed for an aircraft.

BACKGROUND OF THE INVENTION

Controlling various motions of an apparatus typically comprises an inefficient process with little flexibility. Accordingly, there exists a need in the art to overcome the deficiencies and limitations described herein above.

SUMMARY OF THE INVENTION

The present invention provides a apparatus comprising: a rotor assembly; a first blade assembly movably attached to the rotor assembly at a first initial position; a second blade assembly movably attached to the rotor assembly at a second initial position opposite to the first initial position, wherein an initial angle of 180 degrees exists between the first blade assembly with the respect to the second blade assembly, wherein the rotor assembly is configured to rotate the first blade assembly and the second blade assembly in a first direction and a second direction opposite to the first direction; and a movement mechanism configured to move the rotor assembly in a first lateral direction along an axis such that a first angle exists between the first blade assembly with the respect to the second blade assembly, and wherein the first angle does not comprise an angle of 180 degrees.

The present invention provides an apparatus comprising: a rotor assembly comprising a shaft; a first blade assembly pivotally attached to the shaft at a first initial position, wherein the rotor assembly is configured to rotate the first blade in a first direction and a second direction opposite to the first direction; and a movement mechanism configured to move the rotor assembly in a first lateral direction along an axis such that a first angle exists between the first blade assembly and the shaft, wherein the movement mechanism is configured to move the rotor assembly in a second lateral direction along the axis such that a second angle exists between the first blade assembly and the shaft, and wherein the first angle differs from the second angle, and wherein the first lateral direction is opposite to the second lateral direction.

The present invention provides a method comprising: providing an apparatus comprising a rotor assembly, a first blade assembly movably attached to the rotor assembly at a first initial position, a second blade assembly movably attached to the rotor assembly at a second initial position opposite to the first initial position, and a movement mechanism, wherein an initial angle of 180 degrees exists between the first blade assembly with the respect to the second blade assembly; rotating, by the rotor assembly, the first blade assembly and the second blade assembly in a first direction; and moving, by the movement mechanism, the rotor assembly in a first lateral direction along an axis such that a first angle exists between the first blade assembly with the respect to the second blade assembly, wherein the first angle does not comprise an angle of 180 degrees.

The present invention provides a computer program product, comprising a computer readable storage medium having a computer readable program code embodied therein, the computer readable program code comprising an algorithm that when executed by a computer processor of a computing system implements a method for controlling an apparatus comprising a rotor assembly, a first blade assembly movably attached to the rotor assembly at a first initial position, a second blade assembly movably attached to the rotor assembly at a second initial position opposite to the first initial position, and a movement mechanism, and wherein an initial angle of 180 degrees exists between the first blade assembly with the respect to the second blade assembly, the method comprising: rotating, by the rotor assembly, the first blade assembly and the second blade assembly in a first direction; and moving, by the movement mechanism, the rotor assembly in a first lateral direction along an axis such that a first angle exists between the first blade assembly with the respect to the second blade assembly, wherein the first angle does not comprise an angle of 180 degrees.

The present invention advantageously provides a simple method and associated system capable of controlling various motions of an apparatus.

DETAILED DESCRIPTION OF THE INVENTION

Figure 1:
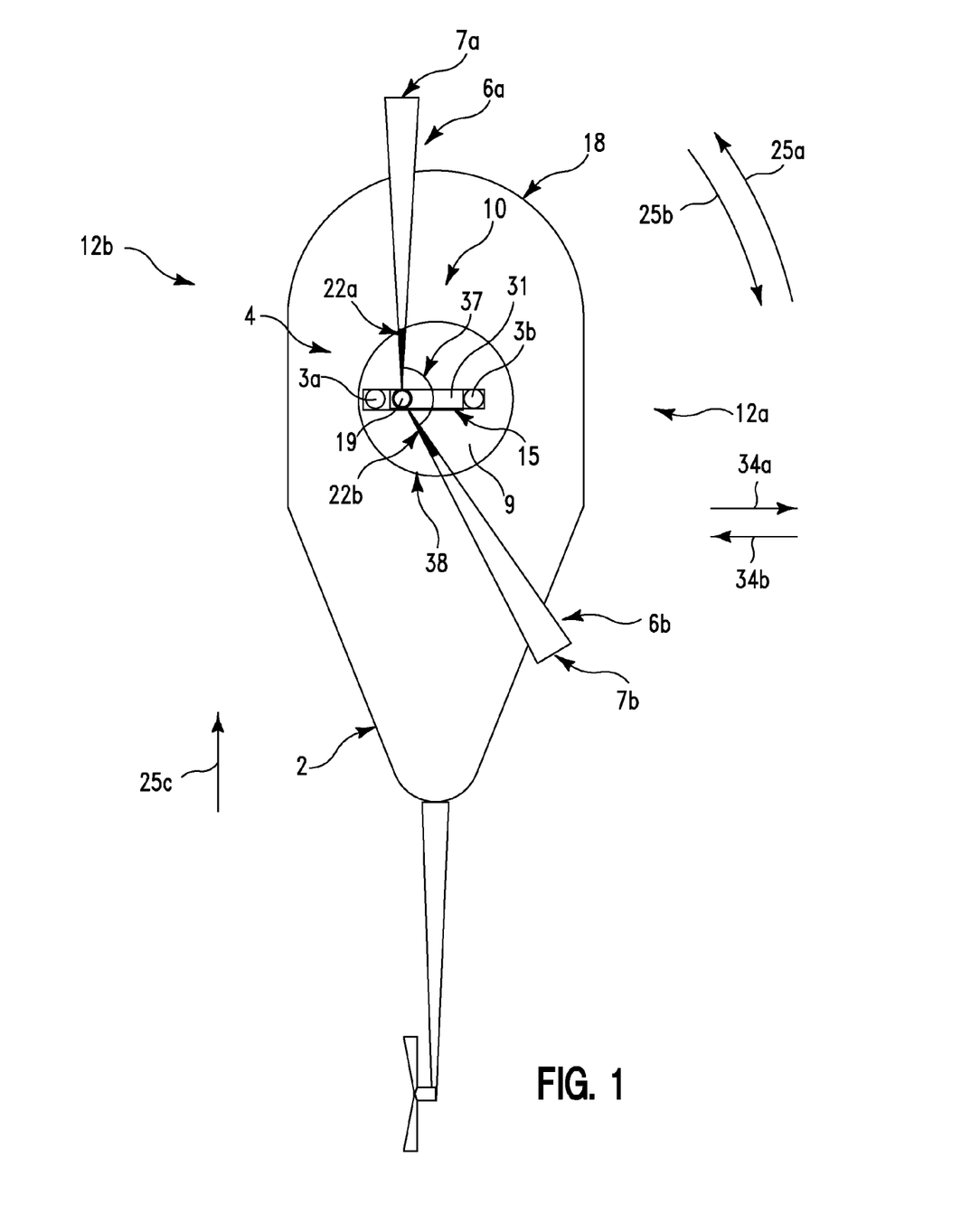
FIG. 1 illustrates a top view of an aircraft comprising an apparatus for controlling a blade speed for an aircraft, in accordance with embodiments of the present invention.

FIG. 1 illustrates a top view of an aircraft 18 comprising an apparatus 4 for controlling a blade speed for an aircraft 18, in accordance with embodiments of the present invention. Aircraft 18 may comprise any type of aircraft including, inter alia, a helicopter, an airplane, etc. Apparatus 4 enables aircraft 18 to fly in various directions (e.g., up, down, forward, backwards, etc). Aircraft 18 may fly in a helicopter translation direction 25c along an x-axis. Apparatus 2 comprises blade assemblies 6a and 6b movably attached to a rotor 19 or center shaft (e.g., in opposite initial positions). Note that apparatus 4 may comprise any number of blade assemblies (e.g., 1, 2, 3, 4, 5 . . . , etc). Additionally, note that blade assemblies 6a and 6b may comprise a same length of different lengths. Apparatus 2 additionally comprises a movement mechanism 31 and a rotation crown 9 that includes a slide channel 15. Rotation crown 9 and/or rotor 19 is configured to rotate blade assemblies 6a and 6b in directions 25a and 25b. Before rotation of blade assemblies 6a and 6b, an initial angle of 180 degrees may exist between blade assembly 6a with said respect to blade assembly 6b. Movement mechanism 31 is configured to move rotor 19 (within slide channel 15 or within a plurality of openings 3a and 3b that exist instead of slide channel) in lateral directions 34a and 34b along an y-axis such that a first angle 37 exists between blade assembly 6a and 6b in order to compensate for speed limitation (i.e., for aircraft 18) due to speed (i.e., a speed of sound) reached by an advancing blade tip (e.g., blade assembly 6b) and a stall of a retreating blade tip (e.g., blade assembly 6a). First angle 37 may comprise any angle that is not 180 degrees. Movement mechanism 31 may include ant type of electromechanical device capable of move rotor 19 in lateral directions 34a and 34b. For example, movement mechanism 31 may include, inter alia, a hydraulic cylinder mechanism, a stepper motor, a solenoid, a spring loaded movement mechanism, etc. Blade assembly 6a comprises an elongated blade 7a mechanically attached to a flexible coupler 22a. Flexible coupler 22a mechanically attaches elongated blade 7a to rotor 19. Flexible coupler 22a is configured to allow elongated blade 7a to move in different positions with respect to rotor 19 and blade assembly 6b. Blade assembly 6b comprises an elongated blade 7b mechanically attached to a flexible coupler 22b. Flexible coupler 22b mechanically attaches elongated blade 7b to rotor 19. Flexible coupler 22b is configured to allow elongated blade 7b to move in different positions with respect to rotor 19 and blade assembly 6a. Flexible couplers 22a and 22b may include any type of flexible coupler including, inter alia, a spring loaded coupler (comprising a spring), an elastic based coupler, etc.

Apparatus 4 enables aircraft 18 to increase a top end speed to be greater than 400 km/h by correcting a speed dissymmetry between blades 7a and 7b. For example, blade 7b moving in an advancing direction (i.e., direction 25b) in combination with blade 7a moving in a retreating direction (i.e., direction 25a) generates a load dissymmetry between side 12a of aircraft 18 and side 12b of aircraft 18. The load dissymmetry limits a maximum load, increases consumption, and generates a great deal of strain on rotor 19. Apparatus 4 enables each of blades 7a and 7b to achieve independent (i.e., with respect to each other) variable speeds according to their position in a rotation cycle. Additionally, apparatus 4 disables a transonic phenomenon by shifting an axis of rotor 19 while keeping rotation crown 9 in a same position. Flexible couplers 22a and 22b compensate (i.e., for blades 7a and 7b) for a difference in distance between a point of traction and an axis of rotation. A control system 38 may be configured to generate a control signal for driving a position of an axis of rotor 19 (e.g., moving rotor 19 within slide channel 15). The aforementioned position may be dependent on flight conditions in terms of speed and load. Control system 38 may comprise a notification system configured to notify an individual that movement mechanism 31 is moving rotor 19 along the y-axis.

Figure 2:
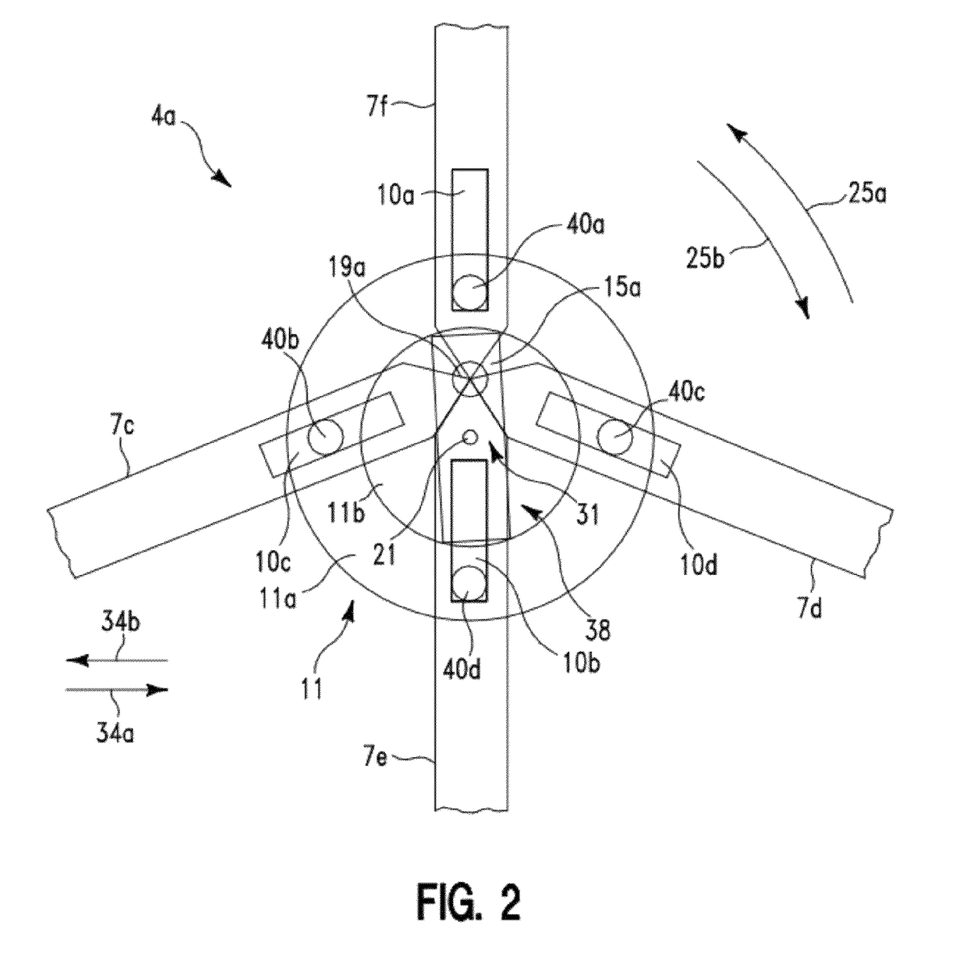
FIG. 2 illustrates an alternative apparatus to apparatus of FIG. 1, in accordance with embodiments of the present invention.

FIG. 2 illustrates an alternative apparatus 4a to apparatus 4 of FIG. 1, in accordance with embodiments of the present invention. In contrast to apparatus 4 of FIG. 1, apparatus 4a of FIG. 2 comprises alternative blades 7c . . . 7f and an alternative rotation crown 11. Note that apparatus 4a may comprise any number of blade assemblies (e.g., 1, 2, 3, 5 . . . , etc). Rotation crown 11 comprises an outer crown 11a and a stationary plate 11b. Outer crown 11a comprises pivot mechanisms 40a . . . 40d (e.g., bearings). Stationary plate 11b comprises a slide channel 15a. Each of blades 7c . . . 7f comprise slide channels 40a . . . 40d respectively. Blades 7c . . . 7f are pivotally attached to rotor 19a (e.g., in opposite initial positions). Outer crown 11a and/or rotor 19a is configured to rotate blades 7c . . . 7f in directions 25a and 25b. Before rotation of blades 7c . . . 7f, an initial angle of 180 degrees may exist between blade 7c with said respect to blade 7d and blade 7e with respect to blade 7f. Movement mechanism 31 is configured to move rotor 19a (within slide channel 15a or within a plurality of openings that exist instead of slide channel) in lateral directions 34a and 34b along an y-axis (and away from a center point 21) such different adjustable angles exist between each of blades 7c . . . 7f. The various angles are formed (i.e., during rotation of outer crown 11a) by moving rotor 19a (within slide channel 15a) in combination with blades 7c . . . 7f pivoting on rotor 19a and each of the associated pivot mechanisms 40 . . . 40d. Additionally, each of slide channels 10a . . . 10d allow the associated blades 7c . . . 7f to slide over the associated pivot mechanisms 40a . . . 40d thereby allowing each of blades to move in different directions and form the aforementioned various angles.

Figure 3:
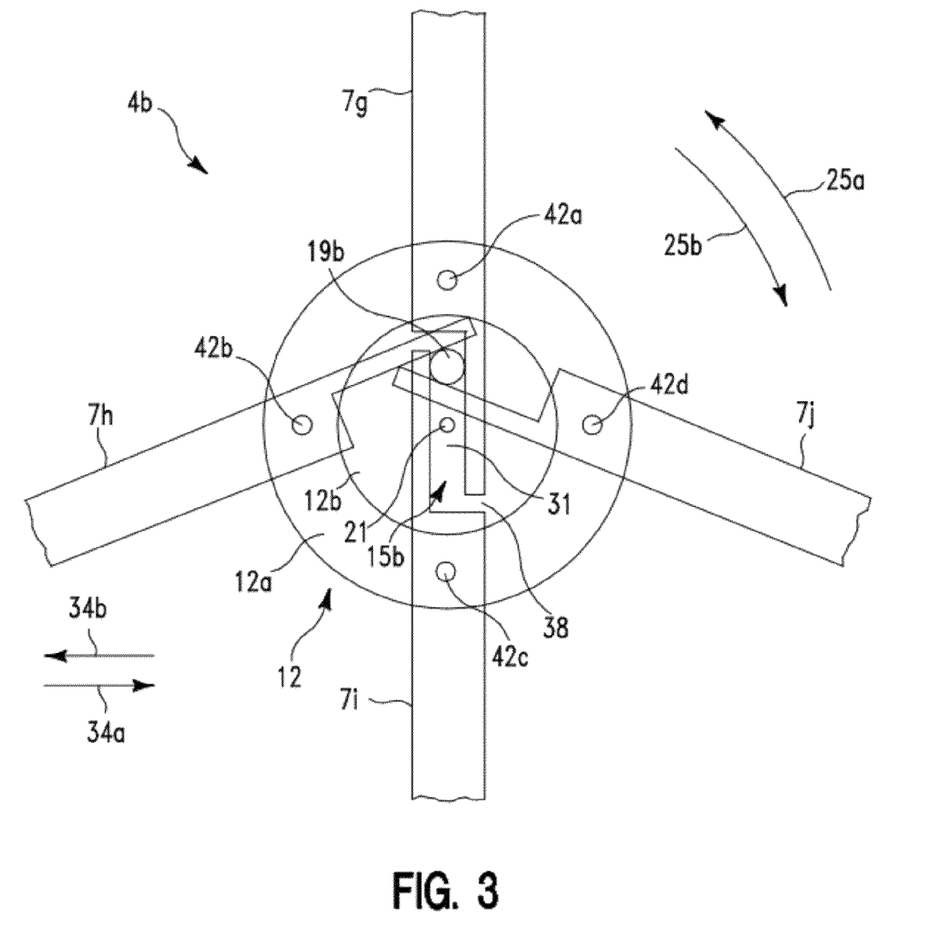
FIG. 3 illustrates an alternative apparatus to apparatus of FIG. 2, in accordance with embodiments of the present invention.

FIG. 3 illustrates an alternative apparatus 4b to apparatus 4a of FIG. 2, in accordance with embodiments of the present invention. In contrast to apparatus 4a of FIG. 2, apparatus 4b of FIG. 3 comprises alternative blades 7g . . . 7j and an alternative rotation crown 12. Note that apparatus 4b may comprise any number of blade assemblies (e.g., 1, 2, 3, 5 . . . , etc). Rotation crown 12 comprises an outer crown 12a and a stationary plate 12b. Outer crown 12a comprises pivot mechanisms 42a . . . 42d (e.g., bearings). Each of blades 7g . . . 7j are pivotally attached to an associated pivot mechanism 42a . . . 42d. Blades 7g . . . 7j (in combination) form a slide channel 15b. Blades 7g . . . 7j are configured to pivotally move along rotor 19b. Rotor 19b may comprise a bearing assembly. Outer crown 12a is configured to rotate blades 7g . . . 7j in directions 25a and 25b. Before rotation of blades 7g . . . 7j, an initial angle of 180 degrees may exist between blade 7g with said respect to blade 7i and blade 7h with respect to blade 7j. Movement mechanism 31 is configured to move rotor 19b (within slide channel 15b) in lateral directions 34a and 34b along an y-axis (and away from a center point 21) such different adjustable angles exist between each of blades 7g . . . 7j. The various angles are formed (i.e., during rotation of outer crown 12a) by moving rotor 19b (within slide channel 15b) in combination with blades 7g . . . 7j pivoting around rotor 19b and each of the associated pivot mechanisms 42a . . . 42d.

Figure 4:
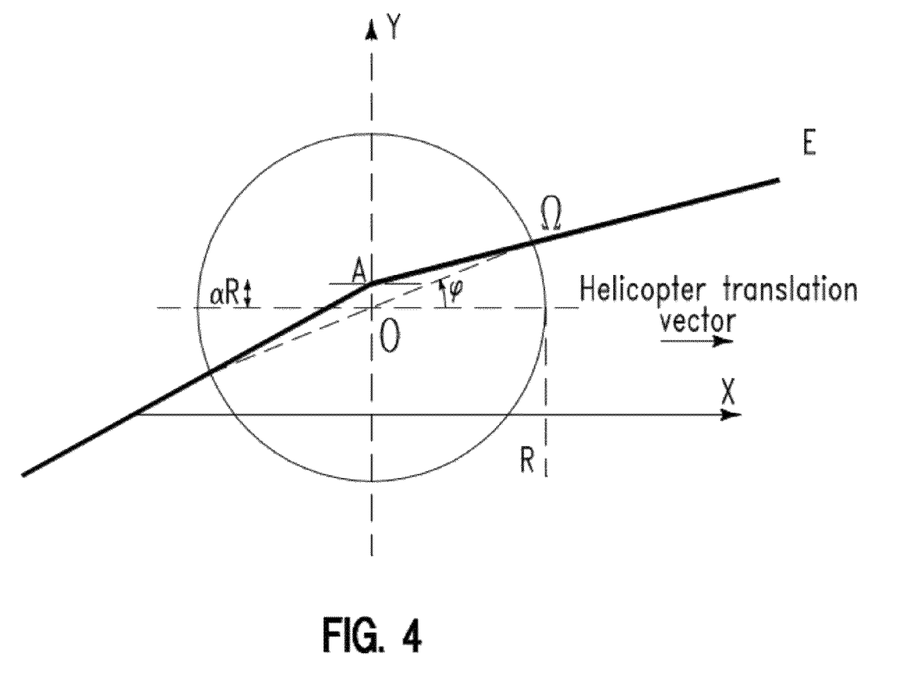
FIG. 4 illustrates a diagram describing calculations for determining angular movement of any of the blades of FIGS. 1-3, in accordance with embodiments of the present invention.

FIG. 4 illustrates a diagram describing calculations for determining angular movement of any of the blades of FIGS. 1-3, in accordance with embodiments of the present invention. From the following equation 1:

$$O = \begin{vmatrix} 0 \\ St \end{vmatrix}, \vec{OA} = \begin{vmatrix} 0 \\ \alpha R \end{vmatrix}, \vec{O\Omega} = \begin{vmatrix} R\cos\varphi \\ R\sin\varphi \end{vmatrix},$$

$$\varphi = \omega t, \vec{AE} = \lambda \vec{A\Omega}, \|\vec{AE}\|^2 = L^2, E = \begin{vmatrix} X \\ Y \end{vmatrix}$$

Coordinates of the point E may be derived:

$$X = \frac{L\cos(\omega t)}{\sqrt{1 + \alpha^2 - 2\alpha\sin(\omega t)}}, Y = St + \alpha R + \frac{L(\sin(\omega t) - \alpha)}{\sqrt{1 + \alpha^2 - 2\alpha\sin(\omega t)}}$$

Corresponding speeds are derived using the following equation:

$$\frac{\partial X}{\partial t} = \frac{L\omega(1 - \alpha\sin(\omega t))(\alpha - \sin(\omega t))}{(1 + \alpha^2 - 2\alpha\sin(\omega t))^{3/2}},$$

-continued $$\frac{\partial Y}{\partial t} = S + \frac{L\omega(1 - \alpha\sin(\omega t))\cos(\omega t)}{(1 + \alpha^2 - 2\alpha\sin(\omega t))^{3/2}}$$

Figure 5A:
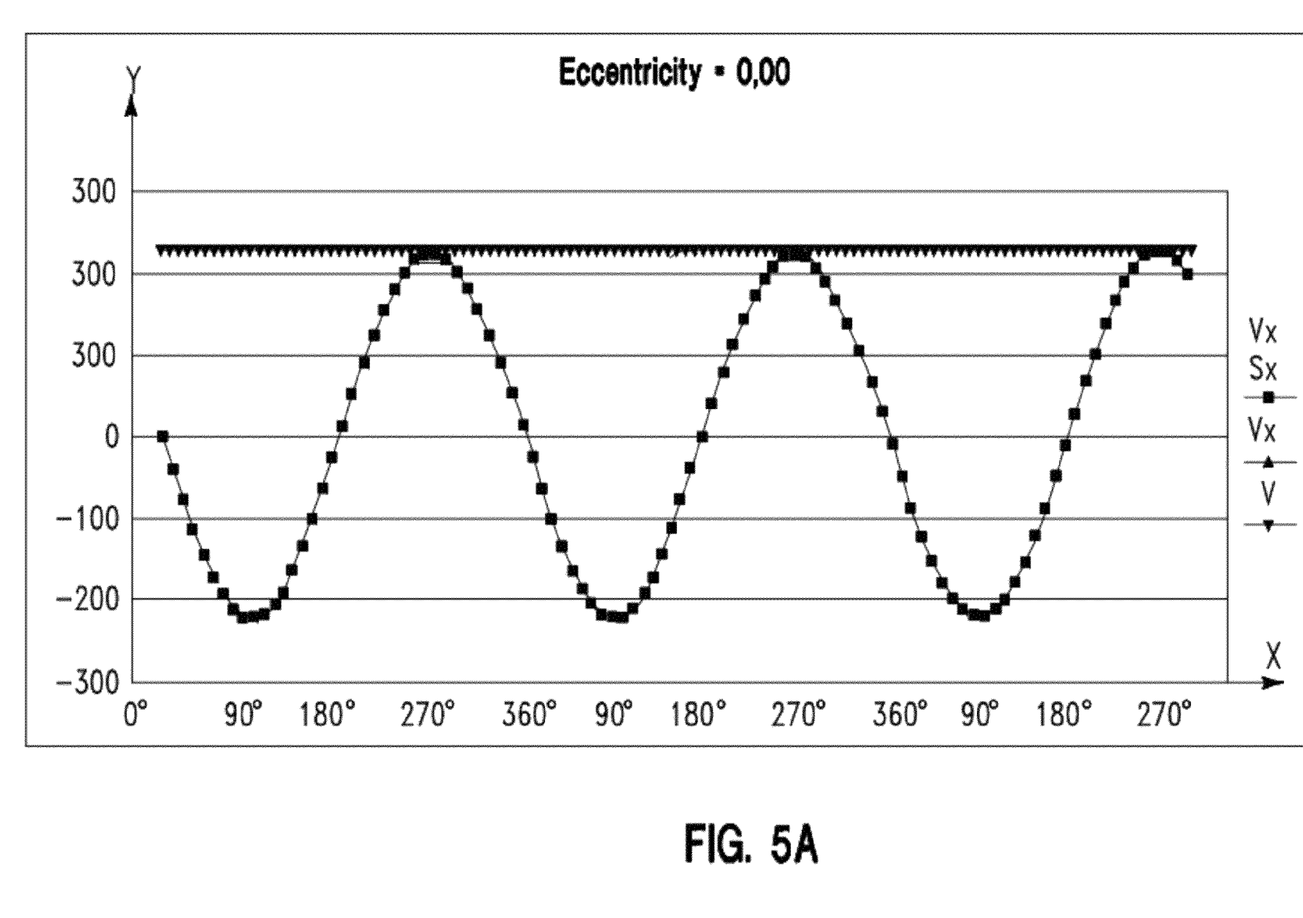
FIG. 5A illustrates a graph describing an example of a stationary flight for aircraft of FIGS. 1-3 as a function of eccentricity, in accordance with embodiments of the present invention.

FIG. 5A illustrates a graph describing an example of a stationary flight for aircraft 18 of FIGS. 1-3 as a function of eccentricity, in accordance with embodiments of the present invention.

Figure 5B:
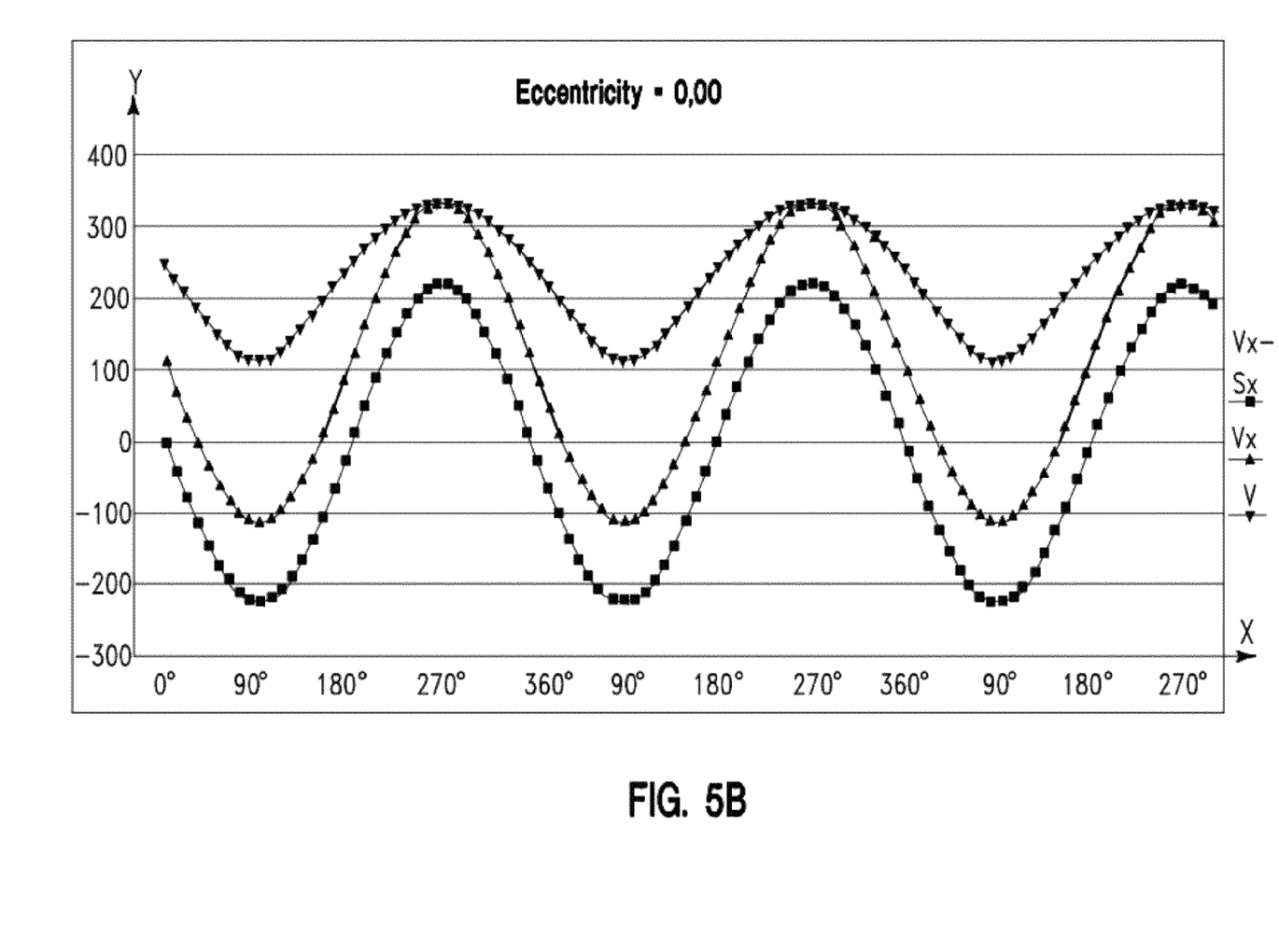
FIG. 5B illustrates an alternative graph to the graph of FIG. 5A, in accordance with embodiments of the present invention.
Figure 5C:
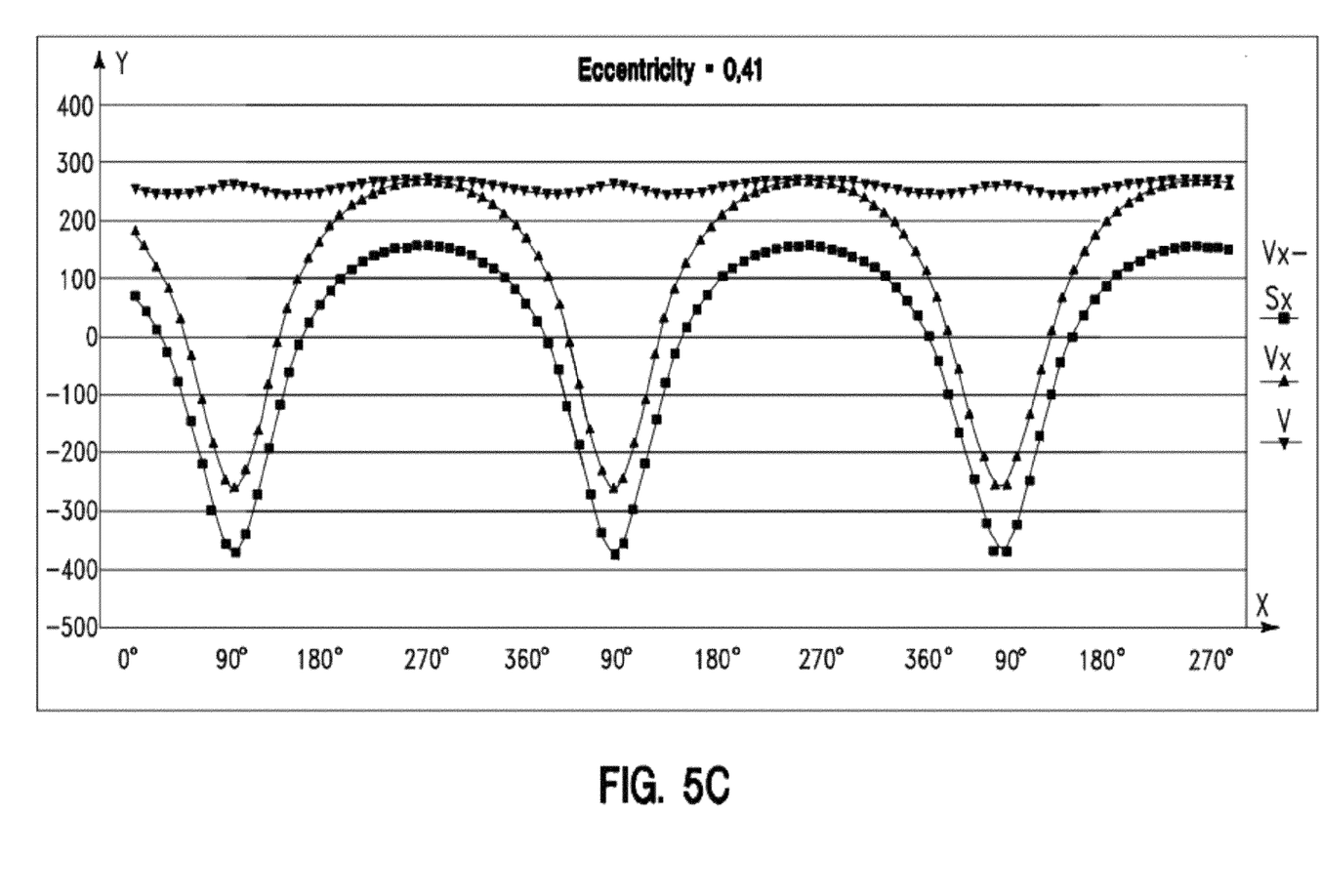
FIG. 5C illustrates an alternative graph to the graph of FIG. 5B, in accordance with embodiments of the present invention.

The following simulation parameters apply to aircraft 18 with respect to the graphs of FIGS. 5A-5C:
Blade length L=10 m
Aircraft speed S=400 km/h
Rotor radius R=0.2 m (or Rotation Crown)
Rotor eccentricity α=variable from 0 to 1 as the proportion of R
Angular speed ω=22.22 rad/s In the example illustrated in FIG. 5A, aircraft 18 is flying in a stationary mode (i.e., a displacement speed=0). The rotation crown (e.g., rotation crown 9 of FIG. 1) is rotating at 22.22 radians/second thereby inducing a linear speed at each blade tip of: 800 Km/h. In the graph of FIG. 5, the Y-axis represents a speed in meters per second and the X-axis represents a blade position during rotor rotation (i.e., in degrees). Vx represents a tip blade speed on the X axis in an air referential. Sx represents an aircraft speed on the X axis in the air referential. Vx−Sx represents a tip blade speed on the X axis in an aircraft referential. V represents a relative to an air absolute tip blade speed. The graph of FIG. 5A illustrates aircraft 18 in stationary flight where V is a constant (222.22 m/s=800 Km/h), Sx=0, and therefore Vx−Sx=Vx resulting in a perfect sinusoidal wave.

FIG. 5B illustrates an alternative graph to the graph of FIG. 5A, in accordance with embodiments of the present invention. In contrast to the graph of FIG. 5A, the graph of FIG. 5B describes an example of a translation flight for aircraft 18 of FIGS. 1-3. The simulation parameters described with respect to the graph of FIG. 5A are applicable to the graph of FIG. 5B. In the example illustrated in FIG. 5B, aircraft 18 is flying in forward translation along the X axis at 400 Km/h (i.e., 111.111 m/s) and a blade tip air speed varies from 400 Km/h to 1,200 Km/h thereby causing an advancing blade to reach a supersonic speed limit and a retreating blade reach a stall speed limit resulting in a V amplitude limiting translation speed.

FIG. 5C illustrates an alternative graph to the graph of FIG. 5B, in accordance with embodiments of the present invention. In contrast to the graph of FIG. 5B, the graph of FIG. 5C describes an example of a translation flight with rotor eccentricity for aircraft 18 of FIGS. 1-3. The simulation parameters described with respect to the graph of FIG. 5A are applicable to the graph of FIG. 5C. In the example illustrated in FIG. 5C, aircraft 18 is flying in forward translation along the X axis at 400 Km/h (i.e., 111.111 m/s) and the rotor is moved in a left direction: 41×R=0.41×20 cm=8.2 cm. A blade tip air speed varies from 247 to 269 m/s (i.e., 889 to 967 Km/h) thereby allowing a speed of aircraft 18 to increase by 176 Km/h and allowing aircraft 18 to fly at 576 Km/h instead of 400 Km/h. FIG. 5C illustrates that V only causes a small variation as an effect of rotor displacement.

Figure 6:
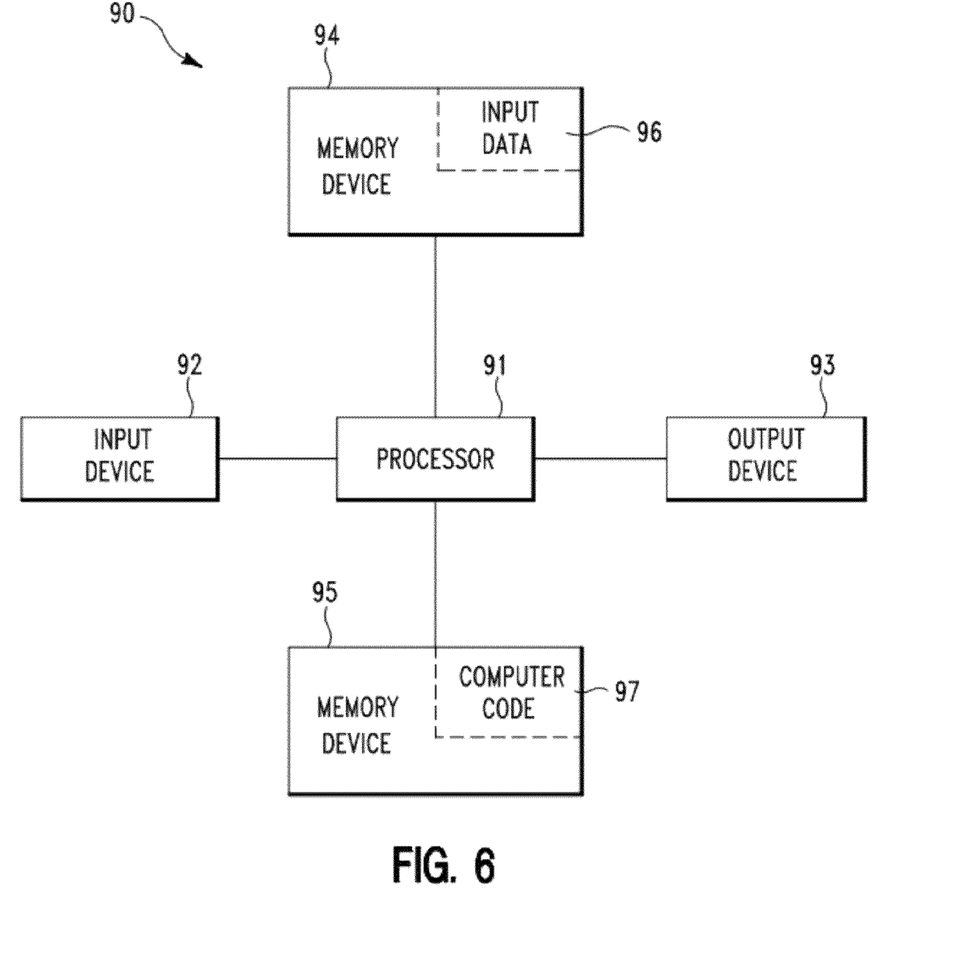
FIG. 6 illustrates a computer apparatus used for controlling a blade speed for the aircraft of FIGS. 1-3, in accordance with embodiments of the present invention.

FIG. 6 illustrates a computer apparatus 90 used for controlling a blade speed for aircraft 18 of FIGS. 1-3, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms for controlling a blade speed for aircraft 18 of FIGS. 1-3. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise an algorithm and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to control a blade speed for aircraft 18 of FIGS. 1-3. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for controlling a blade speed for aircraft 18 of FIGS. 1-3. In another embodiment, the invention provides a method that performs the process steps of the invention on a subscription, advertising, and/or fee basis. That is, a service provider, such as a Solution Integrator, could offer to control a blade speed for aircraft 18 of FIGS. 1-3. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:
1. An apparatus comprising:
a rotor assembly, wherein said rotor assembly comprises a rotation crown, a stationary plate, and a center shaft, and wherein said rotation crown comprises a plurality of pivot mechanism bearings;

a first blade assembly movably attached to said rotor assembly at a first initial position, wherein said first blade assembly comprises a first slide channel;

a second blade assembly movably attached to said rotor assembly at a second initial position opposite to said first initial position, wherein said second blade assembly comprises a second slide channel, wherein an initial angle of 180 degrees exists between said first blade assembly with said respect to said second blade assembly, wherein said rotor assembly is configured to rotate said first blade assembly and said second blade assembly in a first direction and a second direction opposite to said first direction;

a movement mechanism configured to move a portion of said rotor assembly in a first lateral direction along an axis such that a first angle exists between said first blade assembly with said respect to said second blade assembly, wherein said first angle does not comprise an angle of 180 degrees, wherein said first blade assembly is pivotally and slidably attached, via said first slide channel, to said rotation crown at a first pivot mechanism bearing of said plurality of pivot mechanism bearings on said rotation crown, wherein said second blade assembly is pivotally and slidably, via said second slide channel, to said rotation crown at a second pivot mechanism bearing of said plurality of pivot mechanism bearings on said rotation crown, wherein said rotation crown is configured to rotate said first blade assembly and said second blade assembly in said first direction and said second direction, and wherein said first blade assembly and said second blade assembly are pivotally attached to said center shaft at a same location on said center shaft, wherein said stationary plate comprises a slide channel running along said axis, and wherein said movement mechanism is further configured to automatically and slidably move said center shaft within said slide channel in said first lateral direction along said axis; and a control system configured to generate a control signal configured to enable said movement mechanism to move said rotor assembly in said first lateral direction along said axis.

2. The apparatus of claim 1, wherein said movement mechanism configured to move said portion of said rotor assembly in a second lateral direction along said axis such that a second angle exists between said first blade assembly with said respect to said second blade assembly, and wherein said second angle does not comprise an angle of 180 degrees, and wherein said first lateral direction is opposite to said second lateral direction.

3. The apparatus of claim 1, wherein said first blade assembly comprises a first elongated blade mechanically attached to a first flexible coupler, wherein said first flexible coupler mechanically attaches said first elongated blade to said rotor assembly, wherein said first flexible coupler is configured to allow said first elongated blade to move in different positions with respect to said rotor assembly and said second blade assembly, wherein said second blade assembly comprises a second elongated blade mechanically attached to a second flexible coupler, wherein said second flexible coupler mechanically attaches said second elongated blade to said rotor assembly, wherein said second flexible coupler is configured to allow said second elongated blade to move in different positions with respect to said rotor assembly and said first blade assembly, wherein said first flexible coupler comprises a flexible coupler selected from the group consisting of a spring loaded coupler and an elastic based coupler, and wherein said second flexible coupler comprises a flexible coupler selected from the group consisting of a spring loaded coupler and an elastic based coupler.

4. The apparatus of claim 1, wherein said movement mechanism comprises an apparatus selected from the group consisting of a hydraulic apparatus configured to hydraulically move said rotor assembly in said first lateral direction along said y-axis and a stepper motor configured to move said rotor assembly in said first lateral direction along said y-axis.

5. The apparatus of claim 1, further comprising:
a third blade assembly movably attached to said rotor assembly at a third initial position; and
a fourth blade assembly movably attached to said rotor assembly at a fourth initial position opposite to said third initial position, wherein an initial angle of 180 degrees exists between said third blade assembly with said respect to said fourth blade assembly, wherein said rotor assembly is configured to rotate said third blade assembly and said fourth blade assembly in said first direction and said second direction, wherein said movement mechanism is configured to move said portion of said rotor assembly in said first lateral direction along said axis such that a second angle exists between said third blade assembly with said respect to said fourth blade assembly, and wherein said second angle does not comprise an angle of 180 degrees.

6. The apparatus of claim 1, wherein said apparatus is comprised by a helicopter.

7. The apparatus of claim 1, further comprising:
a notification system configured to notify an individual that said movement mechanism is moving said rotor assembly in said first lateral direction along said axis.

8. The apparatus of claim 1, wherein said first blade assembly comprises a first length, and wherein said second blade assembly comprises a second length differing from said first length.

9. An apparatus comprising:
a rotor assembly comprising a center shaft, a rotation crown, and a stationary plate;
a first blade assembly pivotally attached to said shaft at a first initial position, wherein said rotor assembly is configured to rotate said first blade and said second blade in a first direction and a second direction opposite to said first direction; and
a movement mechanism configured to move a portion of said rotor assembly in a first lateral direction along a y-axis such that a first angle exists between said first blade assembly and said shaft, wherein said movement mechanism is configured to move said portion of said rotor assembly in a second lateral direction along said y-axis such that a second angle exists between said first blade assembly and said shaft, and wherein said first angle differs from said second angle, wherein said first lateral direction is opposite to said second lateral direction, wherein said stationary plate comprises a plurality of openings running along said axis, and wherein said movement mechanism is further configured to automatically and sequentially move said center shaft into each opening of said plurality of openings in said first lateral direction along said axis; and
a control system configured to generate a control signal configured to enable said movement mechanism to automatically and sequentially move said rotor assembly in said first lateral direction along said axis.

10. A method comprising:
providing an apparatus comprising a rotor assembly, a first blade assembly, comprising a first slide channel, movably attached to said rotor assembly at a first initial position, a second blade assembly, comprising a second slide channel, movably attached to said rotor assembly at a second initial position opposite to said first initial position, a control system, and a movement mechanism, wherein an initial angle of 180 degrees exists between said first blade assembly with said respect to said second blade assembly, wherein said rotor assembly comprises a rotation crown, a stationary plate, and a center shaft, wherein said rotation crown comprises a plurality of pivot mechanism bearings, wherein said first blade assembly is pivotally and slidably attached, via said first slide channel, to said rotation crown at a first pivot mechanism bearing of said plurality of pivot mechanism bearings on said rotation crown, wherein said second blade assembly is pivotally and slidably, via said second slide channel, to said rotation crown at a second pivot mechanism bearing of said plurality of pivot mechanism bearings on said rotation crown, and wherein said stationary plate comprises a slide channel running along said axis;

rotating, by said rotor assembly, said first blade assembly and said second blade assembly in a first direction;

automatically and slidably moving, by said movement mechanism, said center shaft within said slide channel and in a first lateral direction along an axis such that: said first blade assembly pivotally and slidably moves via said first slide channel with respect to said first pivot mechanism bearing; said second blade assembly pivotally and slidably moves via said second slide channel with respect to said second pivot mechanism bearing; and a first angle exists between said first blade assembly with said respect to said second blade assembly, and wherein said first angle does not comprise an angle of 180 degrees; and generating, by said control system, a control signal; and enabling, by said control signal, said movement mechanism to move said rotor assembly in said first lateral direction along said axis.

11. The method of claim 10, further comprising:
moving, by said movement mechanism, said portion of said rotor assembly in a second lateral direction along said axis such that a second angle exists between said first blade assembly with said respect to said second blade assembly, wherein said second angle does not comprise an angle of 180 degrees, and wherein said first lateral direction is opposite to said second lateral direction.

12. The method of claim 10, wherein said first blade assembly comprises a first elongated blade mechanically attached to a first flexible coupler, wherein said first flexible coupler mechanically attaches said first elongated blade to said rotor assembly, wherein said second blade assembly comprises a second elongated blade mechanically attached to a second flexible coupler, wherein said second flexible coupler mechanically attaches said second elongated blade to said rotor assembly, and wherein said method further comprises:
during said rotating and said moving, first moving by said first flexible coupler, said first elongated blade in different positions with respect to said rotor assembly and said second blade assembly; and
during said rotating and said moving, second moving by said second flexible coupler, said second elongated blade in different positions with respect to said rotor assembly and said first blade assembly.

13. The method of claim 10, wherein said movement mechanism comprises a hydraulic apparatus, and wherein said moving further comprises hydraulically moving by said hydraulic apparatus, said rotor assembly in said first lateral direction along said axis.

14. The method of claim 10, wherein said apparatus further comprises a third blade assembly movably attached to said rotor assembly at a third initial position and a fourth blade assembly movably attached to said rotor assembly at a fourth initial position opposite to said third initial position, wherein an initial angle of 180 degrees exists between said third blade assembly with said respect to said fourth blade assembly, wherein said rotating further comprises rotating said third blade and said fourth blade in said first direction, wherein said moving further results in a second angle existing between said third blade with said respect to said fourth blade, and wherein said second angle does not comprise an angle of 180 degrees.

15. The method of claim 10, wherein said apparatus further comprises a notification system, and wherein said method further comprises:
notifying, by said notification system, an individual that said movement mechanism is moving said rotor assembly in said first lateral direction along said axis.

16. The method of claim 10, further comprising:
providing at least one support service for at least one of creating, integrating, hosting, maintaining, and deploying computer-readable code in said computing system, wherein the code in combination with the computing system is capable of performing said rotating and said moving.

17. A computer program product, comprising a computer readable storage medium having a computer readable program code embodied therein, said computer readable program code comprising an algorithm that when executed by a computer processor of a computing system implements a method for controlling an apparatus comprising a rotor assembly, a first blade assembly, comprising a first slide channel, movably attached to said rotor assembly at a first initial position, a second blade assembly, comprising a second slide channel, movably attached to said rotor assembly at a second initial position opposite to said first initial position, a control system, and a movement mechanism, wherein an initial angle of 180 degrees exists between said first blade assembly with said respect to said second blade assembly, wherein said rotor assembly comprises a rotation crown, a stationary plate, and a center shaft, wherein said rotation crown comprises a plurality of pivot mechanism bearings, wherein said first blade assembly is pivotally and slidably attached, via said first slide channel, to said rotation crown at a first pivot mechanism bearing of said plurality of pivot mechanism bearings on said rotation crown, wherein said second blade assembly is pivotally and slidably, via said second slide channel, to said rotation crown at a second pivot mechanism bearing of said plurality of pivot mechanism bearings on said rotation crown, and wherein said stationary plate comprises a slide channel running along said axis, said method comprising:
rotating, by said rotor assembly, said first blade assembly and said second blade assembly in a first direction;
automatically and slidably moving, by said movement mechanism, said center shaft within said slide channel and in a first lateral direction along an axis such that: said first blade assembly pivotally and slidably moves via said first slide channel with respect to said first pivot mechanism bearing; said second blade assembly pivotally and slidably moves via said second slide channel with respect to said second pivot mechanism bearing; and a first angle exists between said first blade assembly with said respect to said second blade assembly, and wherein said first angle does not comprise an angle of 180 degrees;

generating, by said control system, a control signal; and enabling, by said control signal, said movement mechanism to move said rotor assembly in said first lateral direction along said axis.

18. The computer program product of claim 17, wherein said computer readable program code further comprises instructions for monitoring said apparatus, and wherein said method further comprises:

monitoring, by said computer processor executing said instructions, said apparatus.

* * * * *